US009480965B2

(12) United States Patent
Chuang et al.

(10) Patent No.: US 9,480,965 B2
(45) Date of Patent: Nov. 1, 2016

(54) METHOD FOR PREPARING GRANULATED INORGANIC ADSORBENT FOR RADIONUCLIDES

(71) Applicant: Institute of Nuclear Energy Research Atomic Energy Council, Executive Yuan, Taoyuan County (TW)

(72) Inventors: Li-Ching Chuang, Taoyuan County (TW); Chi-Hung Liao, Taoyuan County (TW); Jen-Chieh Chung, Taoyuan County (TW); Kou-Min Lin, Taoyuan County (TW); Sheng-Wei Chiang, Taoyuan County (TW); Kuang-Li Chien, Taoyuan County (TW); Zhe-Cheng Hu, Taoyuan County (TW); Wen-Chi Tsai, Taoyuan County (TW)

(73) Assignee: INSTITUTE OF NUCLEAR ENERGY RESEARCH ATOMIC ENERGY COUNCIL, EXECUTIVE YUAN, Taoyuan County (TW)

( * ) Notice: Subject to any disclaimer, the term of this patent is extended or adjusted under 35 U.S.C. 154(b) by 0 days.

(21) Appl. No.: 14/527,941

(22) Filed: Oct. 30, 2014

(65) Prior Publication Data
US 2016/0067672 A1 Mar. 10, 2016

(30) Foreign Application Priority Data

Sep. 5, 2014 (TW) .............................. 103130854 A

(51) Int. Cl.
| | |
|---|---|
| *B01J 20/18* | (2006.01) |
| *B01J 20/02* | (2006.01) |
| *B01J 20/16* | (2006.01) |
| *B01J 20/06* | (2006.01) |
| *B01J 20/04* | (2006.01) |
| *B01J 20/30* | (2006.01) |

(52) U.S. Cl.
CPC ................. *B01J 20/18* (2013.01); *B01J 20/02* (2013.01); *B01J 20/0211* (2013.01); *B01J 20/0218* (2013.01); *B01J 20/0229* (2013.01); *B01J 20/0251* (2013.01); *B01J 20/0274* (2013.01); *B01J 20/0292* (2013.01); *B01J 20/041* (2013.01); *B01J 20/06* (2013.01); *B01J 20/165* (2013.01); *B01J 20/3021* (2013.01); *B01J 20/3028* (2013.01); *B01J 20/3042* (2013.01); *B01J 20/3071* (2013.01); *B01J 20/3085* (2013.01)

(58) Field of Classification Search
CPC ...... B01J 20/18; B01J 20/02; B01J 20/0229; B01J 20/06; B01J 20/041; B01J 20/3021
See application file for complete search history.

(56) References Cited

U.S. PATENT DOCUMENTS 8,394,739 B2 * 3/2013 Al-Jlil ..................... B01J 20/12
210/688

*Primary Examiner* — Aileen B Felton
(74) *Attorney, Agent, or Firm* — WPAT, PC; Justin King

(57) ABSTRACT

Disclosed is a method for preparing a granulated inorganic adsorbent for radionuclides including slurry forming, solidification, drying and hardening, granulation, and washing steps: blending a dihydrogen phosphate, a powdered inorganic adsorbent raw material and a setting time regulator in water to form a slurry; adding sintered magnesia into the slurry, and blending the mixture to form a solidified slurry; setting the solidified slurry on a disk member, and naturally drying to hardening in a specific temperature range to form a hardened solid material; smashing the hardened solid material and performing vibration sieving by using a screen to obtain a granulated inorganic adsorbent for radionuclides containing residual reagents; washing the granulated inorganic adsorbent for radionuclides containing residual reagents with water, to remove the residual reagents to complete preparation, where the adsorption capacity of the granulated inorganic adsorbent for radionuclides thus prepared is in the range of 0.7 to 1.9 meq/g.

19 Claims, 4 Drawing Sheets

METHOD FOR PREPARING GRANULATED INORGANIC ADSORBENT FOR RADIONUCLIDES

BACKGROUND

1. Technical Field

The present invention discloses a method for manufacturing a granulated inorganic adsorbent for radionuclides, and more particularly to a method for preparing a granulated inorganic adsorbent for radionuclides for removing $^{137}Cs$ in a radioactive liquid waste at high selectivity.

2. Related Art

Nuclear is a mature power generation technology currently and is also one of energy technologies that can reduce carbon dioxide emissions, and today, a large number of counties around the world have put a lot of construction to develop the nuclear industry. Although nuclear power generation can bring people many convenience in life, in the application process, many radioactive or radioactively contaminated wastes are generated, which must be properly handled and disposed, and isolated from people's living area, so as to avoid environmental contamination and ensure that people can enjoy well-being of nuclear energy with safety. Radioactive wastes can be classified into three types, namely, solid wastes, liquid wastes and gas wastes according to the nature of state. Except that the radioactive wastes contain radionuclides, the radioactive wastes are similar to common industrial wastes, so the treatment technology of the radioactive wastes is similar to that of common wastes, but the radionuclides in the wastes need to be separated and intercepted at high treatment efficiency, and stabilized to prevent its release into the environment, so as to ensure that the ecological environment from being polluted. The treatment principle of radioactive liquid wastes includes separating and removing the radionuclides from the overall liquid waste to make the overall liquid waste meet environmental emission standards, and subjecting the overall liquid waste to volume concentration to facilitate subsequent fixing treatment and final disposal operations.

The fission product $^{137}Cs$ in the radioactive liquid wastes generated in nuclear power plants has a half life period of moderately toxic radioactive nuclides, but the fission yield of $^{137}Cs$ in the mass distribution curve of the fission product is up to 6.14%, which is the maximum content in the total radioactivity of the fission products of the used nuclear fuel after cooling, so $^{137}Cs$ is the main radionuclide in the radioactive liquid wastes of nuclear power plants. Additionally, the liquid wastes generated in operation, during the decommissioning and the decontamination process of nuclear power plants and the laboratory wastes all contain $^{137}Cs$ radionuclide. $^{137}Cs$ has the following main properties: (1) having a long half life period, (2) having energy of γ ray, (3) belonging to Group IA of the sixth cycle in the periodic table of elements, and being easy to lose electrons to form a stable monovalent cation. However, most of the compounds in the environment are monovalent, so the stable monovalent cation of $^{137}Cs$ can easily enter the environment, thus being harmful to humans. Therefore, it is required to remove the $^{137}Cs$ radionuclide in the liquid wastes to reduce the volume and the mass, and to immobilize the $^{137}Cs$ radionuclide for storage and final disposal.

The currently commonly used methods for treating radioactive liquid waste containing $^{137}Cs$ radionuclides are mainly classified into the types below:

(1) Evaporation concentration method: After being treated by the evaporation concentration method, the concentrate of the radioactive liquid waste can be finally disposed after fixing, and the distillate can be treated by an ion exchange resin and then discharged. However, this treatment method has the main disadvantage that the energy consumption is too high, and if most of the radioactive liquid wastes is weak acids and salts, for example, when the specific activity of the $^{137}Cs$ radionuclide is about $10^7$ to $10^9$ Bq/L, and the salt NaCl content in the concentrate approximately is 400-500 g/L, severe corrosion of evaporation concentration equipment easily occurs. Therefore, for the evaporation concentration technology, high-salt content $^{137}Cs$ radionuclide liquid wastes are difficult to be treated.

(2) Natural silicon aluminate treatment method: A natural silicon aluminate of Kaolin, rectorite and vermiculite having certain ion exchange capacity is filled in a column for stream washing treatment of separated radionuclide liquid wastes. However, for this type of natural silicon aluminates, and the ion exchange capacity and the selectivity for the $^{137}Cs$ radionuclide are low, so a large amount of secondary solid wastes are generated.

(3) Zeolite treatment method: Common natural zeolite or artificial synthetic zeolite has a regular crystal structure, and can effectively adsorb radionuclides, and theoretically has good adsorption capacity for $^{137}Cs$ radionuclide. However, when the radioactive liquid wastes contain other monovalent ions (such as $K^+$ or $Na^+$), zeolite cannot effectively adsorb the $^{137}Cs$ radionuclide, so the zeolite treatment manner has low selectivity for the $^{137}Cs$ radionuclide.

(4) Ferrocyanide treatment method: Ferrocyanide salts (such as Co, Ni, Zn and Cu) have extremely high selectivity for the $^{137}Cs$ radionuclide, when the $Na^+$ concentration is 5 mole/L, the selectivity coefficient for Cs may be up to 1,500,000 (Nuclear Science and Engineering, 137, 206-214, 2001). However, the ferrocyanide salt powder is extremely fine and cannot be effectively applied in columns for practical treatment of a large amount of liquid wastes. According to relevant researches of Marden, with silicon dioxide as a support, ferrocyanide salts are fixed on silicon dioxide, and solvent evaporation is repeated for multiple times. The method has the disadvantages that a large amount of organic solution is consumed, and the maximum load is merely 1.36 g-ferrocyanide salts/g-$SiO_2$, thus having little practical application. According to the patent specification of CN100551519C, urea-formaldehyde condensed $TiO_2$ is immersed in potassium ferrocyanide (0.7 M) and hydrochloric acid (1 M) to obtain a $TiO_2$-potassium ferrocyanide adsorbent material. However, this material has a not high specific surface area (about 14 $m^2/g$) and a high mechanical strength, and cannot be easily smashed, and cannot be easily fixed with the urea-formaldehyde condensed $TiO_2$ material. Furthermore, Terada (Talanta 1970, 17, 955-963) and Konecny (Radioanal. Chem., 1973, 14, 255-266) both describe a method including first adsorbing potassium ferrocyanide in silicon dioxide, and then converting with transition metallic ions (such as Co, Ni, Zn and Cu) to form a ferrocyanide salt adsorbent. However, the conversion reaction is extremely slow, excessive metal ions need to be used, the conversion reaction is difficult to control, and the loss amount of potassium ferrocyanide in silicon dioxide during the reaction with ions.

In view of the above, among the methods for treating $^{137}Cs$ radionuclide radioactive liquid wastes, an inorganic adsorbent (natural silicon aluminate, zeolite and ferrocyanide salts) are mainly used to adsorb the $^{137}Cs$ radionuclide. However, the natural silicon aluminate and zeolite have low selectivity to the $^{137}Cs$ radionuclide and low adsorption capacity. Ferrocyanide salts have higher selectivity to the $^{137}$Cs radionuclide and the adsorption capacity, compared with other inorganic adsorbents. However, after synthesis, ferrocyanide salts are mainly in the form of a powder and are easily dispersed in water, and most of persons of ordinary skill in field of radioactive liquid waste treatment adopts a column to treat liquid wastes, since ferrocyanide salts are in the form of a powder, pressure drop in the column is increased, resulting in excessively high number of times of stream washing and generation of excessive secondary wastes. Therefore, the effect of practical treatment of radioactive liquid wastes is not ideal.

SUMMARY

In order to solve the problems in the prior art, in the present invention, ferrocyanide salts are granulated, easy operation of production process is taken into consideration, and the selectivity and the adsorption capacity for the $^{137}$Cs radionuclide after granulation need to be maintained at the level of the ferrocyanide salts in the original form of powder. Therefore, the present invention discloses a method for preparing a granulated inorganic adsorbent for Cs radionuclide in radioactive liquid wastes at high selectivity, in which ferrocyanide salts are combined with a fixing agent and fixed, and then smashed and sieved to form a granulated ferrocyanide salt inorganic adsorbent. The ferrocyanide salt inorganic adsorbent has high selectivity and high adsorption capacity for $^{137}$Cs radionuclide. The method includes the following steps:

a slurry forming step: blending a dihydrogen phosphate, a powdered inorganic adsorbent raw material and a setting time regulator in water to form a slurry; a fixing step: adding sintered magnesia into the slurry, and blending the mixture to form a fixed slurry; a drying and hardening step: setting the fixed slurry on a disk member, and naturally drying to hardening in a specific temperature range to form a hardened solid material; a granulation step: smashing the hardened solid material and performing vibration sieving by using a screen, to obtain a granulated inorganic adsorbent for radionuclides containing residual reagents; and; and a washing step: washing the granulated inorganic adsorbent for radionuclides containing residual reagents with water, to remove the residual reagents, so as to obtain a granulated inorganic adsorbent for radionuclides, where the adsorption capacity of the inorganic adsorbent is in the range of 0.7 to 1.9 meq/g.

According to the granulated inorganic adsorbent for radionuclides prepared by the preparation method of the present invention, because the granulated ferrocyanide salt inorganic adsorbent is formed by smashing and sieving after fixing by using ferrocyanide salts and a fixing agent, the ferrocyanide salt inorganic adsorbent has high selectivity to $^{137}$Cs radionuclides and high adsorption capacity.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
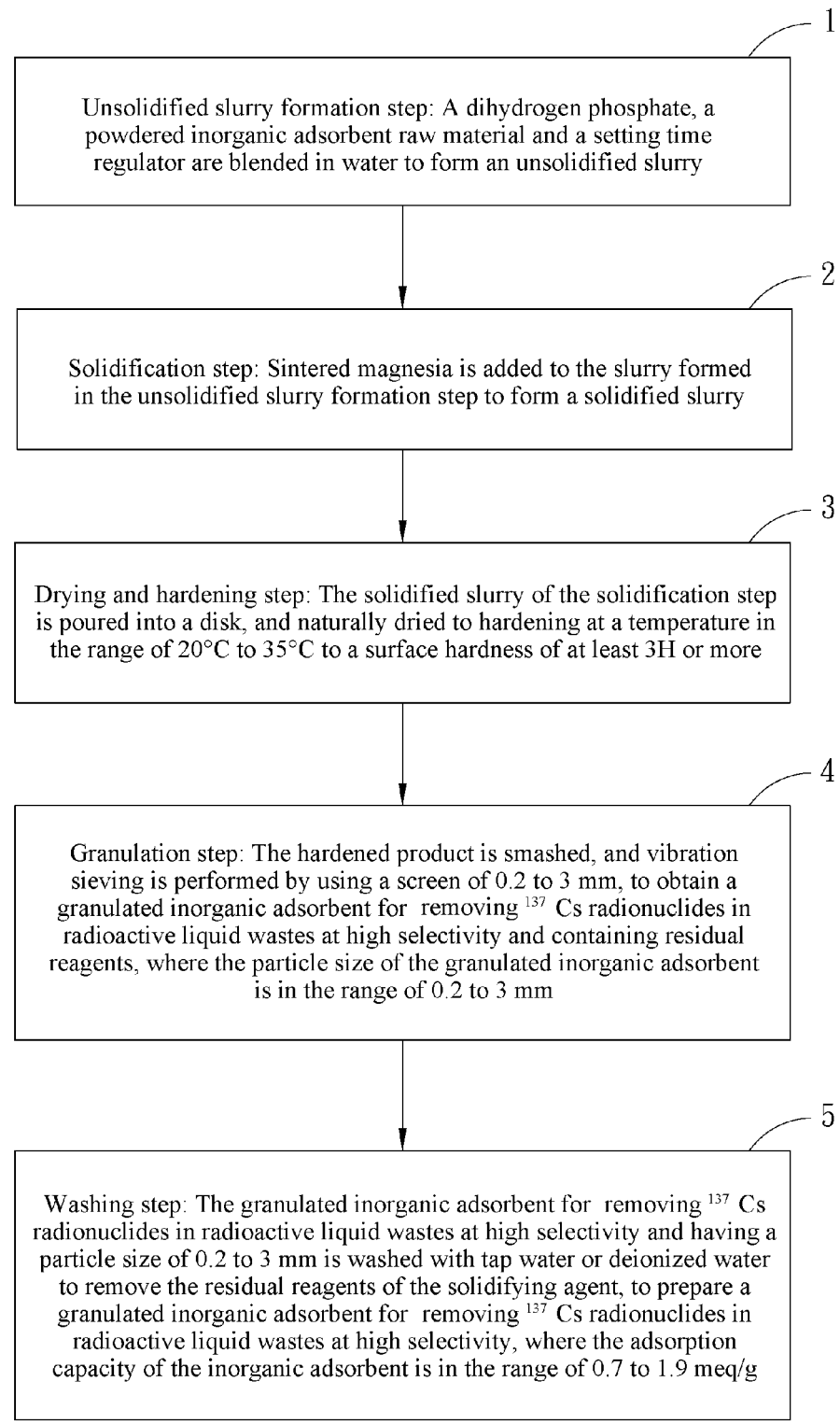
FIG. 1 shows steps of a method for preparing a granulated inorganic adsorbent for radionuclides of the present invention.
Figure 2:
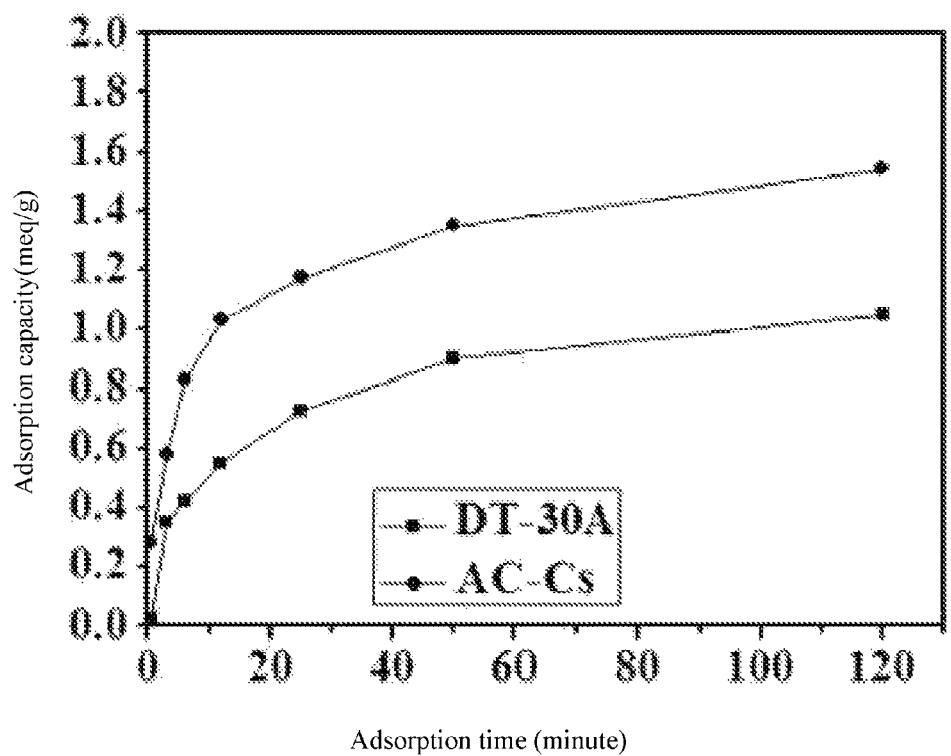
FIG. 2 shows a chart of a Cs ion adsorption efficiency comparison between the granulated inorganic adsorbent (AC-Cs) of the present invention and a commercially available DT-30A tested at different time.

Referring to FIG. 1, the present invention provides a method for manufacturing a granulated inorganic adsorbent for removing $^{137}$Cs radionuclides in radioactive liquid wastes at high selectivity, which includes the following steps:

(1) Unfixed slurry formation step: A dihydrogen phosphate, a powdered inorganic adsorbent raw material and a setting time regulator are blended in water to form an unfixed slurry.

(2) Fixing step: Sintered magnesia is added to the slurry formed in the unfixed slurry formation step to form a fixed slurry.

(3) Drying and hardening step: The fixed slurry of the fixing step is poured into a disk, and naturally dried to hardening at a temperature in the range of 20° C. to 35° C. to a surface hardness of at least 3H or more.

(4) Granulation step: The hardened product is smashed, and vibration sieving is performed by using a screen of 0.2 to 3 mm, to obtain a granulated inorganic adsorbent for removing $^{137}$Cs radionuclides in radioactive liquid wastes at high selectivity and containing residual reagents, where the particle size of the granulated inorganic adsorbent is in the range of 0.2 to 3 mm.

(5) Washing step: The granulated inorganic adsorbent for removing $^{137}$Cs radionuclides in radioactive liquid wastes at high selectivity and having a particle size of 0.2 to 3 mm is washed with tap water or deionized water to remove the residual reagents of the fixing agent, to prepare a granulated inorganic adsorbent for removing $^{137}$Cs radionuclides in radioactive liquid wastes at high selectivity, where the adsorption capacity of the inorganic adsorbent is in the range of 0.7 to 1.9 meq/g.

As described above, in the unfixed slurry formation step (1), the useful dihydrogen phosphate may be one or a mixture of more than two selected from ammonium dihydrogen phosphate ($NH_4H_2PO_4$), potassium dihydrogen phosphate ($KH_2PO_4$), sodium dihydrogen phosphate ($NaH_2PO_4$), calcium dihydrogen phosphate ($CaH_4P_2O_8$) and magnesium dihydrogen phosphate ($Mg(H_2PO_4)_2 \cdot 2H_2O$), but is not limited herein; the useful setting time regulator is boric acid ($H_3BO_3$) or borax ($Na_2B_4O_7 \cdot 10H_2O$), or a mixture thereof, but is not limited herein; the useful powdered inorganic adsorbent is not particularly limited and may be a powdered inorganic adsorbent material that the nature will not changed in an acidic environment, and includes, for example, (1) natural zeolite ($Na[AlSi_2O_6] \cdot H_2O$ or $Ca[Al_2Si_3O_{10}] \cdot 3H_2O$), or artificial zeolite (permutite); (2) composite ion exchange materials (titanium phosphate ($Ti_3(PO_4)_4$, TiP) composited ammonium phosphosphomolybdate (ammonium phosphomolybdate, $(NH_4)_3PMo_{12}O_{40}$, AMP), zirconium phosphate ($Zr_3(PO_4)_4$, ZrP) composited ammonium phosphomolybdate (ZrP-AMP) and tin phosphate ($Sn_2P_2O_7$, SnP) composited ammonium phosphomolybdate (SnP-AMP)); (3) metallic ferrocyanides and ferricyanides ([Fe(CN)$_6$]$^{4-}$, ferricyanide); (4) heteropoly acid salts, ammonium phosphotungstate (APW), zirconium phosphotungstate (PWZr) and zirconium phosphomolybdate (PMoZr), and ZrHP; (5) multivalent metallic phosphate; (6) multivalent metallic (transition metallic) oxyhydroxides and hydroxides, wherein these powdered inorganic adsorbents mentioned above may be used alone or in combination of more than two thereof.

As described above, because among the materials used in the powdered inorganic adsorbent for removing $^{137}Cs$ radionuclides in radioactive liquid wastes at high selectivity, the metallic ferrocyanides and ferricyanides ($[Fe(CN)^6]_4^-$) have extremely high chemical stability and mechanical stability, high radiation tolerance, a large pore diameter and a large surface area, and extremely high selectivity for $^{137}Cs$ radionuclides, and include any one or a mixture of two of ferrocyanides such as cadmium ferrocyanide, nickel ferrocyanide, copper ferrocyanide, cobalt ferrocyanide and zinc ferrocyanide, but are not limited herein.

As described above, the present invention further discloses a powdered inorganic adsorbent raw material in a powdered inorganic adsorbent for removing $^{137}Cs$ radionuclides in radioactive liquid waste at high selectivity, where a method for preparing the metallic ferrocyanide includes:

A. dissolving a ferrocyanide salt hydrate in water to formulate a first solution containing the ferrocyanide salt hydrate at a concentration of 0.01 to 1 mol/L;

B. dissolving a soluble metal salt in water to formulate a second solution containing the soluble metal salt at a concentration of 0.01 to 1 mol/L;

C. mixing the first solution and the second solution and stirring the mixture to form a paste-like third solution, and continuously stirring for at least 24 hr at a temperature in the range of 20° C. to 35° C.;

D. subjecting the third solution to centrifugal desorption or pressure filtration to remove residual reagents in the third solution, and then washing with tap water or deionized water, where this washing step is performed at least one time or more;

E. drying at a temperature in the range of 60° C. to 90° C. to form a lump-like inorganic adsorbent raw material; and F. smashing and powdering the lump-like inorganic adsorbent raw material, so as to complete the preparation.

As described above, in Step A, the useful ferrocyanide salt hydrate may be selected to be potassium ferrocyanide ($K_4[Fe(CN)_6]\cdot 3H_2O$) or sodium ferrocyanide ($Na_4Fe(CN)_6\cdot 10H_2O$), but is not limited herein, and the useful soluble metal salt may be selected to be any one of zinc nitrate ($Zn(NO_3)_2$), zinc sulfate ($ZnSO_4$), zinc chloride ($ZnCl_2$), zinc formate ($C_2H_2O_4Zn$), zinc acetate ($Zn(CH_3COO)_2$), zinc acetylacetone ($C_{10}H_{14}ZnO_4$), zinc diethyldithiocarbamate ($C_{10}H_{20}N_2S_4Zn$), zinc oleate ($Zn(C_{17}H_{33}CO_2)$), zinc stearate ($Zn(C_{17}H_{35}COO)_2$), zinc decanoate ($C_{20}H_{38}O_4Zn$), zinc laurate ($C_{24}H_{46}O_4Zn$), zinc myristate, cadmium nitrate ($Cd(NO_3)_2$), cadmium sulfate ($CdSO_4$), cadmium chloride ($CdCl_2$), cadmium formate, cadmium acetate, cadmium acetylacetone, cadmium diethyldithiocarbamate, cadmium oleate, cadmium stearate, cadmium decanoate, cadmium laurate, cadmium myristate, cobalt nitrate, cobalt sulfate, cobalt chloride, cobalt formate, cobalt acetate, cobalt acetylacetone, cobalt diethyldithiocarbamate, cobalt oleate, cobalt stearate, cobalt decanoate, cobalt laurate, cobalt myristate, nickel nitrate, nickel sulfate, nickel chloride, nickel formate, nickel acetate, nickel acetylacetone, nickel diethyldithiocarbamate, nickel oleate, nickel stearate, nickel decanoate, nickel laurate, nickel myristate, copper nitrate, copper sulfate, copper chloride, copper formate, copper acetate, copper acetylacetone, copper diethyldithiocarbamate, copper oleate, copper stearate, copper decanoate, copper laurate and copper myristate, but is not limited herein.

As described above, in the fixing step (2), the useful sintered magnesia may be selected to be dead-burned magnesia or light-burned magnesia, or a mixture thereof, but is not limited herein, where dead-burned magnesia refers to magnesia powder material prepared by calcining magnesite, and light-burned magnesia refers to active magnesia powder prepared by the magnesia calcination method, the bischofite-soda ash method, the bischofite-lime method, the bischofite-dolomite method, the bischofite-ammonium bicarbonate method, the bischofite-pyrolysis method or the bischofite partial pyrolysis method.

As described above, in the drying and hardening step (3), the time for naturally drying to hardening at a temperature in the range of 20° C. to 35° C. depends on the room temperature and cannot be generalized. When the room temperature is low, the drying time needs to be prolonged, while the room temperature is high, the drying time is short, and in fact, hardening can be completed in about 1 to 7 days. Additionally, the so-called hardening refers to drying a molded object as cement-like hardening to an extent that the form is fixed and will not deform due to movement or application of external force, and is suitable for being knocked or ground into chips with controllable particle diameter without being absolutely disintegrated and crushed. In numerical representation, the so-called hardening refers to hardening to a surface hardness of at least 3H or more, and preferably at least 5H or more by a wolff-wilborn hardness pencil test (ASTM 3363).

As described above, in the granulation step (4), the smashing method may be selected to be any method capable of smashing blocks such as the knocking smashing method and the rotation smashing method, but is not limited herein; additionally, the particle diameter of granulated inorganic adsorbent sieved by using a screen is in the range of 0.2 to 3 mm, preferably in the range of 0.5 to 2.5 mm, and more preferably in the range of 1 to 2 mm. If the particle diameter of the inorganic adsorbent is less than 0.2 mm, the mechanical strength of the inorganic adsorbent is insufficient, and the structure is easy to collapse when being packed in a column, thus generating a extremely high pressure drop, so the inorganic adsorbent is not easily applied to long-term stream washing operation of practical large columns; if the particle diameter of the inorganic adsorbent is greater than 3 mm, due to large particle diameter, the specific surface area of the granulated inorganic adsorbent is low, resulting in low adsorption capacity.

As described above, in the washing step (5), the solvent used for washing may be selected to be sodium-free deionized water or sodium-containing tap water to remove residual reagents of the fixing agent in the adsorbent, to prepare a granulated inorganic adsorbent for removing $^{137}Cs$ radionuclides in radioactive liquid wastes at high selectivity, where the adsorption capacity is in the range of 0.7 to 1.9 meq/g, preferably in the range of 0.9 to 1.7 meq/g, and more preferably in the range of 1 to 1.6 meq/g. For further illustration, if the adsorption capacity is less than 0.9 meq/g, the working life of the granulated inorganic adsorbent is short, resulting in high frequency of replacement of the inorganic adsorbent and high treatment cost of radioactive liquid wastes As described above, in the unfixed slurry formation step (1), the addition sequence of the dihydrogen phosphate, the powdered inorganic adsorbent raw material and the setting time regulator is not particularly limited, and the amounts of the dihydrogen phosphates, the inorganic adsorbent material, the setting time regulator and water need to meet the following conditions, measured and calculated by weight:

Based on the total weight of the overall fixed slurry of 100 w/w %, the weight range of the dihydrogen phosphate is from 1 w/w % to 15 w/w %, preferably from 2 w/w % to 10 w/w %, and more preferably from 3 w/w % to 8 w/w %; the weight range of the powdered inorganic adsorbent raw material is from 20 w/w % to 60 w/w %, preferably from 30 w/w % to 50 w/w %, and more preferably from 40 w/w % to 45 w/w %, when the weight range of the powdered inorganic adsorbent raw material is lower than 20 w/w %, the adsorption capacity of the adsorbent after granulation is reduced, and if the weight range of the powdered inorganic adsorbent raw material is higher than 60 w/w %, the mechanical strength after fixing is insufficient, resulting in that the structural collapse of the granulated inorganic adsorbent easily occurs in a column; the weight range of the setting time regulator is from 0.01 w/w % to 0.1 w/w %, preferably from 0.02 w/w % to 0.08 w/w %, and more preferably from 0.03 w/w % to 0.06 w/w %; the weight range of water is from 10 w/w % to 40 w/w %, preferably from 20 w/w % to 38 w/w %, and more preferably from 25 w/w % to 35 w/w %.

As described above, in the fixing step (2), the weight of the useful sintered magnesia needs to meet the following condition:

Based on the total weight of the overall fixed slurry of 100 w/w %, the weight range of the sintered magnesia is from 10 w/w % to 40 w/w %, preferably from 14 w/w % to 30 w/w %, and more preferably from 18 w/w % to 25 w/w %.

As described above, the granulated inorganic adsorbent for removing $^{137}$Cs radionuclides in radioactive liquid wastes at high selectivity according to the present invention has the optimum particle diameter of 0.1 to 3 mm suitable for column packing and capable of reducing the pressure drop, and excellent mechanical strength, excellent hydraulic performance and high adsorption capacity.

The present invention are described in more details with embodiment in the following, the embodiments are merely used to illustrate the present invention, but not intended to limit the range of selection of materials, numerals and proportions of the present invention. The powdered inorganic adsorbent raw material in this embodiment is prepared by zinc ferrocyanide described above, and herein, the so-called "powder" in the present invention refers to particles having a particle diameter of less than 150 μm, and the so-called "particles" refers to particles having a particle diameter in the range of 0.2 to 3 mm greater than that of a powder:

A. formulating the first solution: about 4.5 kg potassium ferrocyanide ($K_4[F(CN)_6]\cdot 3H_2O$) was added to 25 L tap water at room temperature, and was completely dissolved;

B. formulating the second solution: about 3.16 kg zinc sulfate ($ZnSO_4\cdot 7H_2O$) was added to 25 L tap water at room temperature, and was completely dissolved;

C. the first solution was added to the second solution, and stirred to uniform mixing, to form a third solution with white solid precipitate, which was stood still and reacted for 24 hr at room temperature (20° C. to 35° C.);

D. the third solution was introduced into a frame filter, unreacted residual reagents were removed by washing with water, the cake on the frame filter was placed in an air conduction oven at a temperature set at 75° to 100° C. and dried, and the dried cake was smashed, to obtain about 5 kg powdered zinc ferrocyanide inorganic adsorbent, which was referred to as powdered zinc ferrocyanide below;

E. 10 L water was placed in a blender, 0.9 g boric acid, 1.16 kg dipotassium hydrogen phosphate and 13 kg powdered zinc ferrocyanide were added into the blender rotating at rotation rate of 100 rpm, then 5.8 kg dead-burned magnesia was added, and the mixture was stirred and mixed for 5 min to obtain a slurry;

F. the slurry after mixing was poured on a disk, and dried for about 3 days at room temperature (20° C. to 35° C.) to hardening to a surface hardness of at least 3H or more; and G. the hardened and molded product was smashed and subjected to vibration sieving by using a screen having a mesh size in the range of 1 to 2 mm, to obtain a granulated inorganic adsorbent containing residual reagents and having a particle diameter in the range of 1 to 2 mm; next, the granulated inorganic adsorbent containing residual reagents was leached with tap water to remove surface particles, and dried at a temperature of 40° C., to obtain granulated inorganic adsorbent having a particle diameter in the range of 1 to 2 mm, which was referred to as AC-Cs.

Referring to FIG. 1, FIG. 1 shows a chart of an adsorption efficiency comparison between the granulated inorganic adsorbent (AC-Cs) prepared in the embodiment of the present invention and a commercially available inorganic adsorbent DT-30A purchased from Diversified Technologies Services INc. tested at different time.

To 30 mL water containing a simulated radioactive liquid waste having a Cs ion concentration of 2,000 ppm, 0.2 g AC-Cs or an inorganic adsorbent DT-30A was added respectively, the mixture was subjected to batch adsorption for 30 sec, 3 min, 6 min, 12 min, 25 min, 50 min and 2 hr, and then analysis of Cs ion concentration in the solution and comparison of the adsorption capacity with the commercially available inorganic adsorbent were performed. As for practical radioactive liquid wastes, the results of the comparison tests may be influenced by the efficiency of the adsorbent under different adsorption time or residence time. With the increase of the adsorption time, the Cs ion concentration is gradually reduced, indicating that Cs in the simulated radioactive liquid waste has been gradually adsorbed by AC-Cs or DT-30A. Additionally, as for DT-30A, after 2 hr of adsorption, the adsorption capacity may be up to 1.05 meq/g; and as for AC-Cs, after 2 hr of adsorption, the adsorption capacity may be up to 1.54 meq/g. Therefore, the ion adsorption capacity of the granulated inorganic adsorbent (AC-Cs) prepared in the present invention at different adsorption time is significantly better than that of the commercially available inorganic adsorbent DT-30A.

Figure 3:
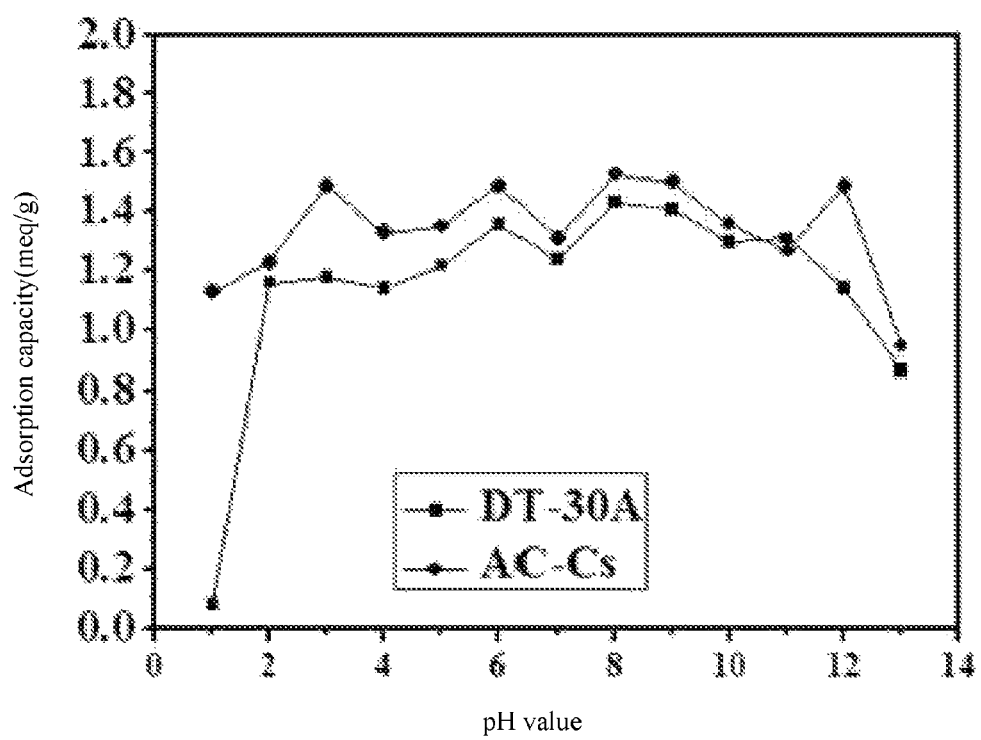
FIG. 3 shows a chart of a Cs ion adsorption capacity comparison between the granulated inorganic adsorbent (AC-Cs) of the present invention and a commercially available DT-30A tested in a pH range from 1 to 13.

Referring to FIG. 3, FIG. 3 shows a chart of a Cs ion adsorption capacity comparison between the granulated inorganic adsorbent (AC-Cs) of the present invention and a commercially available DT-30A tested in a pH range from 1 to 13. To 30 mL water containing a simulated radioactive liquid waste having a Cs ion concentration of 2,000 ppm in different pH ranges of 1 to 13, 0.2 g AC-Cs or inorganic adsorbent DT-30A was added respectively, the mixture was subjected to batch adsorption for 24 hr, and then analysis of Cs ion concentration in the solution and comparison of the adsorption capacity with the commercially available inorganic adsorbent were performed.

As for practical radioactive liquid wastes, the efficiency of the adsorbent may be influenced by different pH value ranges, so radioactive liquid wastes in the pH range of 1 to 13 are simulated. The results of comparison tests are as shown in FIG. 3. As for the DT-30A, when the pH range is 2 to 12, the average adsorption capacity approximately is 1.26 meq/g, while when the pH is 1 or 13, the adsorption capacity is reduced to 0.08 meq/g and 0.87 meq/g; as for the AC-Cs, when the pH range is 2 to 12, the average adsorption capacity approximately is 1.39 meq/g, while when the pH is 1 or 13, the adsorption capacity is reduced to 1.13 meq/g and 0.95 meq/g. Although the adsorption capacity of the AC-Cs is low at pH of 1 or 13, compared with commercially available DT-30A, the adsorption capacity is better than that of the commercially available DT-30A. Additionally, as for the AC-Cs, the adsorption capacity has no significant reduce in the pH range of 2 to 12, even better than that of the commercially available DT-30A, indicating that the ion adsorption capacity of the granulated inorganic adsorbent AC-Cs prepared in the present invention in different pH ranges is significantly better than that of the commercially available inorganic adsorbent DT-30A.

Figure 4:
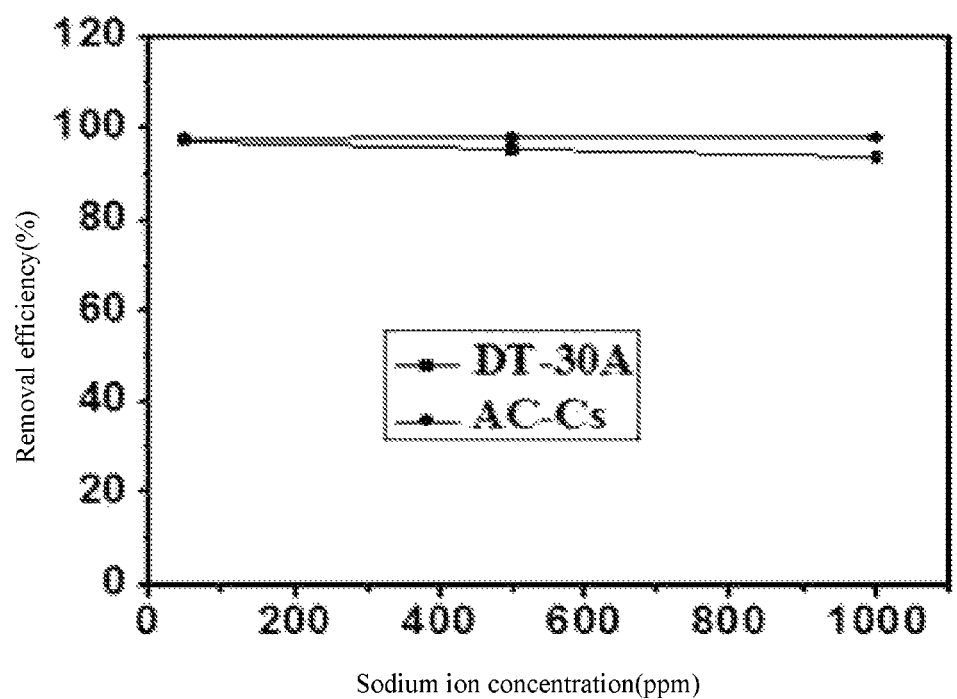
FIG. 4 shows a chart of a Cs adsorption efficiency comparison between the granulated inorganic adsorbent (AC-Cs) of the present invention and a commercially available DT-30A tested at different sodium ion concentrations.

Referring to FIG. 4, FIG. 4 shows a chart of a Cs adsorption efficiency comparison between the granulated inorganic adsorbent (AC-Cs) of the present invention and a commercially available DT-30A tested at different sodium ion concentrations, which includes data comparison performed at the following experimental conditions:

(1) to 30 mL water containing a simulated radioactive liquid waste having a Cs ion concentration of 2,000 ppm and a sodium ion concentration of 50 ppm and 10 ppm, 0.2 g AC-Cs or inorganic adsorbent DT-30A was added respectively, the mixture was subjected to batch adsorption for 24 hr, and then analysis of Cs ion concentration in the solution and comparison of the adsorption capacity with the commercially available inorganic adsorbent were performed; (2) to 30 mL water containing a simulated radioactive liquid waste having a Cs ion concentration of 2,000 ppm and a sodium ion concentration of 500 ppm and 100 ppm, 0.2 g AC-Cs or inorganic adsorbent DT-30A was added respectively, the mixture was subjected to batch adsorption for 24 hr, and then analysis of Cs ion concentration in the solution and comparison of the adsorption capacity with the commercially available inorganic adsorbent were performed; (3) to 30 mL water containing a simulated radioactive liquid waste having a Cs ion concentration of 2,000 ppm and a sodium ion concentration of 1,000 ppm and 200 ppm, 0.2 g AC-Cs or inorganic adsorbent DT-30A was added respectively, the mixture was subjected to batch adsorption for 24 hr, and then analysis of Cs ion concentration in the solution and comparison of the adsorption capacity with the commercially available inorganic adsorbent were performed, where the methods for calculating the adsorption capacity and the adsorption efficiency were as follows:

Adsorption capacity: the [Cs] concentration difference before and after adsorption is calculated, where $C_0$ is the initial concentration, Ci is the concentration after adsorption, $\Delta C(mgL-1)=C_0-Ci$, then the amount of removed [Cs] is calculated according to the following formula, where V is the liquid waste volume upon adsorption (L): $M(mg)=\Delta C \times V$, the adsorption equivalent number of unit weight of the adsorbent is calculated ([Cs]=132.9, monovalent), $B(meq)=M/(132.9/1)$, and then the equivalent adsorption capacity per gram of adsorbent is calculated, where W is the weight (g) of the adsorbent, $Q(meq/g)=B/W$; the adsorption efficiency R % is calculated according to the following formula: $R\% = (C_0-Ci/C_0) \times 100\%$.

As for practical radioactive liquid wastes, the efficiency of the adsorbent may be influenced by the contained high-concentration sodium ion that is a monovalent ion the same as the Cs ion, so radioactive liquid wastes having sodium ion concentration and Cs concentration in different ranges are simulated. The results of comparison tests are as shown in FIG. 4. At different sodium ion concentrations, the removal efficiency of the commercially available DT-30A may be up to 93% to 97%, while the removal efficiency of the AC-Cs prepared in the present invention may be up to 97% to 98%. Obviously, both the adsorption efficiency of the commercially available DT-30A and the adsorption efficiency of the AC-Cs are not influenced by high-concentration Na ion, and the removal efficiency of the AC-Cs of the present invention is better than that of the commercially available DT-30A.

In view of the above, according to the granulated inorganic adsorbent for removing $^{137}Cs$ radionuclides in radioactive liquid wastes at high selectivity prepared by the preparation method of the present invention, because the granulated ferrocyanide salt inorganic adsorbent is formed by smashing and sieving after fixing by using ferrocyanide salts and a fixing agent in the embodiment, the ferrocyanide salt inorganic adsorbent has high selectivity to $^{137}Cs$ radionuclides and high adsorption capacity, has the optimum particle diameter of 0.1 to 3 mm that is suitable for column packing and capable of reducing the pressure drop, and has excellent mechanical strength, good hydraulic performance and high adsorption capacity, thus being capable of effectively solving the problems in the prior art.

What is claimed is:

1. A method for preparing a granulated inorganic adsorbent for radionuclides, comprising the following steps:
   a slurry forming step: blending a dihydrogen phosphate, a powdered inorganic adsorbent raw material and a setting time regulator in water to form a slurry;
   a fixing step: adding sintered magnesia into the slurry, and blending the mixture to form a fixed slurry;
   a drying and hardening step: setting the fixed slurry on a disk member, and naturally drying to hardening in a specific temperature range to form a hardened solid material;
   a granulation step: smashing the hardened solid material and performing vibration sieving by using a screen, to obtain a granulated inorganic adsorbent for radionuclides containing residual reagents; and
   a washing step: washing the granulated inorganic adsorbent for radionuclides containing residual reagents with water, to remove the residual reagents, so as to obtain a granulated inorganic adsorbent for radionuclides.

2. The method for preparing a granulated inorganic adsorbent for radionuclides of claim 1, wherein the dihydrogen phosphate in the slurry formation step is one or a mixture of more than two selected from ammonium dihydrogen phosphate, potassium dihydrogen phosphate, sodium dihydrogen phosphate, calcium dihydrogen phosphate and magnesium dihydrogen phosphate.

3. The method for preparing a granulated inorganic adsorbent for radionuclides of claim 1, wherein the percentage weight of the dihydrogen phosphate is in the range of 1 w/w % to 15 w/w %, preferably in the range of 2 w/w % to 15 w/w %, and more preferably in the range of 3 w/w % to 8 w/w %, based on the total weight of the fixed slurry.

4. The method for preparing a granulated inorganic adsorbent for radionuclides of claim 1, wherein the powdered inorganic adsorbent raw material is one or a mixture of more than two selected from natural zeolite, artificial zeolite, titanium phosphate composited ammonium phosphomolybdate, zirconium phosphate composited ammonium phosphomolybdate, tin phosphate composited ammonium phosphosphomolybdate, metallic ferrocyanide, ferricyanide, heteropoly acid salt, ammonium phosphotungstate, zirconium phosphotungstate and zirconium phosphomolybdate, multivalent metallic phosphate, transition metallic oxyhydroxides and transition metallic hydroxides.

5. The method for preparing a granulated inorganic adsorbent for radionuclides of claim 1, wherein the powdered inorganic adsorbent raw material is a metallic ferrocyanide, and the metallic ferrocyanide is one or a mixture of more than two selected from cadmium ferrocyanide, nickel ferrocyanide, copper ferrocyanide, cobalt ferrocyanide and zinc ferrocyanide.

6. The method for preparing a granulated inorganic adsorbent for radionuclides of claim 5, further comprises:

dissolving a ferrocyanide salt hydrate in water to formulate a first solution containing the ferrocyanide salt hydrate at a concentration of 0.01 to 1 mol/L;

dissolving a soluble metal salt in water to formulate a second solution containing the soluble metal salt at a concentration of 0.01 to 1 mol/L;

mixing the first solution and the second solution and stirring the mixture to form a slurry-like third solution, and continuously stirring for at least 24 hr at a temperature in the range of 20° C. to 35° C.;

subjecting the third solution to centrifugal desorption or pressure filtration to remove residual reagents in the third solution, and then washing with tap water or deionized water, where this washing is performed at least one time or more;

drying at a temperature in the range of 60° C. to 90° C. to form a lump-like inorganic adsorbent raw material; and smashing and powdering the lump-like inorganic adsorbent raw material, so as to complete the preparation.

7. The method for preparing a granulated inorganic adsorbent for radionuclides of claim 6, wherein the ferrocyanide salt hydrate is potassium ferrocyanide or sodium ferrocyanide.

8. The method for preparing a granulated inorganic adsorbent for radionuclides of claim 6, wherein the soluble metal salt is selected to be any of zinc nitrate, zinc sulfate, zinc chloride, zinc formate, zinc acetate, zinc acetylacetone, zinc diethyldithiocarbamate, zinc oleate, zinc stearate, zinc decanoate, zinc laurate, zinc myristate, cadmium nitrate, cadmium sulfate, cadmium chloride, cadmium formate, cadmium acetate, cadmium acetylacetone, cadmium diethyldithiocarbamate, cadmium oleate, cadmium stearate, cadmium decanoate, cadmium laurate, cadmium myristate, cobalt nitrate, cobalt sulfate, cobalt chloride, cobalt formate, cobalt acetate, cobalt acetylacetone, cobalt diethyldithiocarbamate, cobalt oleate, cobalt stearate, cobalt decanoate, cobalt laurate, cobalt myristate, nickel nitrate, nickel sulfate, nickel chloride, nickel formate, nickel acetate, nickel acetylacetone, nickel diethyldithiocarbamate, nickel oleate, nickel stearate, nickel decanoate, nickel laurate, nickel myristate, copper nitrate, copper sulfate, copper chloride, copper formate, copper acetate, copper acetylacetone, copper diethyldithiocarbamate, copper oleate, copper stearate, copper decanoate, copper laurate or copper myristate.

9. The method for preparing a granulated inorganic adsorbent for radionuclides of claim 1, wherein the weight range of the powdered inorganic adsorbent raw material is from 20 w/w % to 60 w/w %, preferably from 30 w/w % to 50 w/w %, and more preferably from 40 w/w % to 45 w/w %, based on the total weight of the fixed slurry of 100 w/w %.

10. The method for preparing a granulated inorganic adsorbent for radionuclides of claim 1, wherein the setting time regulator is boric acid or borax, or a mixture thereof.

11. The method for preparing a granulated inorganic adsorbent for radionuclides of claim 1, wherein the weight range of the setting time regulator is from 0.01 w/w % to 0.1 w/w %, preferably from 0.02 w/w % to 0.08 w/w %, and more preferably from 0.03 w/w % to 0.06 w/w %, based on the total weight of the fixed slurry of 100 w/w %.

12. The method for preparing a granulated inorganic adsorbent for radionuclides of claim 1, wherein the weight range of the water is from 10 w/w % to 40 w/w %, preferably from 20 w/w % to 38 w/w %, and more preferably from 25 w/w % to 35 w/w %, based on the total weight of the fixed slurry of 100 w/w %.

13. The method for preparing a granulated inorganic adsorbent for radionuclides of claim 1, wherein the sintered magnesia is selected to be dead-burned magnesia, or light-burned magnesia, or a mixture thereof.

14. The method for preparing a granulated inorganic adsorbent for radionuclides of claim 1, wherein the weight range of the sintered magnesia is from 10 w/w % to 40 w/w %, preferably from 14 w/w % to 30 w/w %, and more preferably from 18 w/w % to 25 w/w %, based on the total weight of the fixed slurry of 100 w/w %.

15. The method for preparing a granulated inorganic adsorbent for radionuclides of claim 1, wherein the specific temperature range is 20° C. to 35° C.

16. The method for preparing a granulated inorganic adsorbent for radionuclides of claim 1, wherein the surface hardness of the hardened solid material is at least 3H or more, and preferably at least 5H or more.

17. The method for preparing a granulated inorganic adsorbent for radionuclides of claim 1, wherein the particle diameter of the granulated inorganic adsorbent for radionuclides containing residual reagents after vibration sieving is in the range of 0.2 to 3 mm, preferably in the range of 0.5 to 2.5 mm, and more preferably in the range of 1 to 2 mm.

18. The method for preparing a granulated inorganic adsorbent for radionuclides of claim 1, wherein the water in the washing step is tap water or deionized water.

19. The method for preparing a granulated inorganic adsorbent for radionuclides of claim 1, wherein the granulated inorganic adsorbent for radionuclides has a adsorption capacity, and the adsorption capacity is in the range of 0.7 to 1.9 meq/g, preferably in the range of 0.9 to 1.7 meq/g, and more preferably in the range of 1.0 to 1.6 meq/g.

* * * * *